United States Patent
Sipilä

(10) Patent No.: US 7,308,036 B2
(45) Date of Patent: Dec. 11, 2007

(54) ADAPTIVE SYMBOL MAPPING IN MOBILE SYSTEM

(75) Inventor: Teemu Sipilä, Oulunsalo (FI)

(73) Assignee: Nokia Corporation, Espoo (FI)

( * ) Notice: Subject to any disclaimer, the term of this patent is extended or adjusted under 35 U.S.C. 154(b) by 649 days.

(21) Appl. No.: 10/701,602

(22) Filed: Nov. 6, 2003

(65) Prior Publication Data

US 2004/0101063 A1 May 27, 2004

Related U.S. Application Data

(63) Continuation of application No. PCT/FI02/00388, filed on May 7, 2002.

(30) Foreign Application Priority Data

May 8, 2001 (FI) .................................. 20010963

(51) Int. Cl.
*H04B 7/02* (2006.01)
(52) U.S. Cl. ..................................................... 375/267
(58) Field of Classification Search ................ 375/267, 375/299, 346; 370/208; 455/101
See application file for complete search history.

(56) References Cited

U.S. PATENT DOCUMENTS

| | | | |
|---|---|---|---|
| 5,696,794 A | | 12/1997 | O'Dea |
| 6,594,473 B1* | | 7/2003 | Dabak et al. ................ 455/101 |
| 2002/0196842 A1* | | 12/2002 | Onggosanusi et al. ....... 375/148 |
| 2005/0002326 A1* | | 1/2005 | Ling et al. .................. 370/208 |

FOREIGN PATENT DOCUMENTS

| | | |
|---|---|---|
| EP | 0 544 463 A2 | 6/1993 |
| EP | 0 566 257 A1 | 10/1993 |
| EP | 0 998 045 A1 | 5/2000 |
| EP | 1 073 229 A1 | 1/2001 |
| EP | 1 073 302 A1 | 1/2001 |

OTHER PUBLICATIONS

Mao, Tao R. "*Hybrid Trellis-Coded CPFSK Signaling*" pp. 309-312.
Tonello, Andrea M. "*Space-Time Bit-Interleaved Coded Modulation with an Iterative Decoding Strategy*" pp. 473-478.
Da Silva, George Azevedo et al., "*Transmission Scheme using Fading-Resistant Constellations*", pp. 704-706.
Da Silva, Victor M. et al., "*Fading-Resistant Modulation Using Several Transmitter Antennas*", pp. 1236-1244.
Kohno, Ryuji et al., "*Trellis Coded Modulation Based On Time-Varying Mapping And Encoders For Utilizing A Channel Intersymbol Interference*", pp. 133-143.

* cited by examiner

*Primary Examiner*—Don N. Vo
(74) *Attorney, Agent, or Firm*—Squire, Sanders & Dempsey, LLP

(57) ABSTRACT

An arrangement are provided to transmit information between a transmitter and a receiver in a mobile system, the transmitter comprising a mapping unit configured to map bits of the information to be transmitted to channel symbols, and at least two transmitting antennas configured to transmit the channel symbols to a radio channel of the mobile system. The mobile system comprises a measuring unit configured to measure the status of the radio channel used for the transmission of information. The mapping unit of the transmitter is configured to map the bits to channel symbols using a mapping scheme that is dependent on the radio channel status measured by the measuring unit.

33 Claims, 8 Drawing Sheets

PRIOR ART

ADAPTIVE SYMBOL MAPPING IN MOBILE SYSTEM

This is a Continuation of International Application No. PCT/FI02/00388 filed May 7, 2002, which designated the U.S. and was published under PCT Article 21(2) in English.

FIELD OF THE INVENTION

The invention is applied in mobile systems, particularly systems where information is transmitted between a transmitter and a receiver via at least two transmitting antennas.

BACKGROUND OF THE INVENTION

In a mobile system, several transmitting antennas are employed to transmit user information in the downlink direction. In the uplink direction the use of several antennas will probably become relevant with the new media terminals. Use of a plurality of transmit antenna branches e.g. in a mobile system base station provides diversity gains over the radio connection. Diversity gains are obtained e.g. by means of coherent signal combination and more effective prevention of fading.

The values a signal obtains over the radio connection are modelled by means of complex numbers, where the absolute value or module of the complex number represents signal amplitude and the polar angle or argument of the complex number represents signal phase. The signals transmitted via different antennas are summed in the combined signal propagating over the radio path, the complex values of the signal thus corresponding to the sums of the values obtained by the signals transmitted via different antennas. The set of values the combined signal has obtained in the complex plane is referred to as a combined constellation. A combined constellation is utilized in the receiver for deducing, from the complex value of the combined signal, the signals transmitted from different antenna branches of the transmitter and combined over the radio path to provide the received complex value. In several cases the received complex value does not fully correspond to any constellation point, and the receiver must therefore make a decision for example on the basis of the constellation point that is closest to the received complex value. As the receiver moves in the radio system, the combined constellation is also continuously altered since the transmission channels change e.g. due to different propagation paths of the signals.

The prior art arrangements are able to react to the changing values or locations of the constellation points in the complex plane. However, in these arrangements the bit-to-symbol mapping remains constant during the connection, i.e. mapping of bits to symbols is independent of the channel status. Since the bit-to-symbol mapping is fixed and radio channel statuses keep changing, the likelihood of erroneous bit decisions made by the receiver increases, thus reducing the accuracy of identification of the transmitted information in the receiver.

BRIEF DESCRIPTION OF THE INVENTION

An objective of the invention is to provide an improved method and equipment implementing the method for making correct bit decisions in the receiver. This is achieved by a method described below for transmitting information between a transmitter and a receiver in a mobile system, in which method bits contained in the information to be transmitted are mapped with bit-to-symbol mapping in the transmitter to channel symbols and transmitted to a radio channel via at least two transmitting antennas, and the status of the radio channel used for transmitting information is measured. The method comprises using a bit-to-symbol mapping scheme that is dependent on the measured radio channel status for mapping the bits to channel symbols.

The invention also relates to an arrangement for transmitting information between a transmitter and a receiver in a mobile system, the transmitter comprising mapping means for mapping bits of the information to be transmitted to channel symbols, at least two transmitting antennas for transmitting the channel symbols to a radio channel of the mobile system, and measuring means for measuring the status of the radio channel used for transmission of information. The mapping means of the transmitter are arranged to map the bits to channel symbols by means of a bit-to-symbol mapping scheme that is dependent on the radio channel status measured by the measuring means.

The invention also relates to a transmitter in a mobile system, comprising mapping means for mapping bits of the information to be transmitted to channel symbols, and at least two transmitting antennas for transmitting the channel symbols to a radio channel of the mobile system. The transmitter comprises means for processing measurement information on the status of the mobile system radio channel, and the mapping means are arranged to map the bits to channel symbols by means of a bit-to-symbol mapping scheme that is dependent on the information representing the radio channel status.

The invention further relates to a receiver in a mobile system, comprising means for receiving a combined signal consisting of signals transmitted via at least two transmitting antennas, and means for carrying out bit decisions on the combined signal by means of a combined constellation that represents the values the received signal obtains in the complex plane, and means for processing measurement information on the radio channel used in the transmission of the received signal. The receiver comprises means for reforming the combined constellation used for bit decisions as the radio channel status changes.

The preferred embodiments of the invention are disclosed in the dependent claims.

The invention can be applied in digital radio systems, such as mobile systems. The arrangement according to the invention, which relates to transmission of information between the transmitter and the receiver, is not restricted to the data transmission direction used, but it can be applied to both uplink and downlink transmission. This means that a radio system base station and a terminal equipment operating in the network area can both operate as a transmitter and a receiver. The only restriction is that the transmitter must transmit via at least two transmitting antennas.

In the method, information bits to be transmitted by the transmitter are mapped by means of adaptive bit-to-symbol mapping to channel symbols to be transmitted on a transmission channel. Adaptivity means herein that the bit-to-symbol mapping and the combined constellation related thereto are altered with the changing radio channel status. A change in the radio channel status is detected by means of measurements performed on the channel.

In the receiver bit decisions are carried out on the basis of the values of the received combined signal and the combined constellation used. Whenever the radio channel changes, i.e. the transmission channel transmitted via an antenna changes, the values of the combined constellation must be updated. In a preferred embodiment of the invention, a combined constellation is formed by summing up all the possible combinations of the channel symbols to be transmitted via different transmitting antennas, the symbols being multiplied by channel coefficients corresponding to the transmission channels. The mapping of bits to channel symbols utilizes channel-dependent bit-to-symbol mapping. In another preferred embodiment, the mapping and the resulting combined constellation are selected from a predetermined set of constellations known to the transmitter and the receiver.

Radio channel status can be determined by several methods. The status is preferably determined by means of channel coefficients, each of which corresponds to a particular transmission channel or antenna. A channel coefficient represents the amplitude and phase of the signal transmitted on the transmission channel at one or more instants. Therefore the invention is not restricted to the channel model used, but it can be applied in connection with channel models of one or more taps. The radio channel status or channel parameter can also be given in the form of a phase difference or amplitude difference between antennas.

In a preferred embodiment, the radio channel status is determined in the receiver, which forms an estimate of the channel status by means of the received signal, and signals the estimate to the transmitter. In another preferred embodiment, both the transmitter and the receiver form an estimate of the transmission channel. This embodiment is applicable for example in radio systems based on time division duplex (TDD). In an embodiment, only the transmitter measures the channel, and if needed, it signals channel-related information to the receiver.

Channel-related information is only signalled if necessary, i.e. for example when only the receiver measures the channel and the channel status has changed to such an extent that the bit-to-symbol mapping scheme has to be updated to correspond to the channel status. For example in connection with a channel coefficient, a change in the channel status can be estimated by setting a threshold value for a change of the coefficient, exceeding of the threshold value resulting in a changing bit-to-symbol mapping scheme. The bit-to-symbol mapping scheme and the related combined constellation can also be updated for example periodically.

The bit-to-symbol mapping and the related mapping of information bits to binary indices preferably employ such a mapping scheme that results in the combined constellation in a minimum Hamming distance between adjacent constellation points.

BRIEF DESCRIPTION OF THE FIGURES

The invention will be described below in more detail in connection with the preferred embodiments and with reference to the accompanying drawings, in which.

DESCRIPTION OF THE PREFERRED EMBODIMENTS

Figure 1:
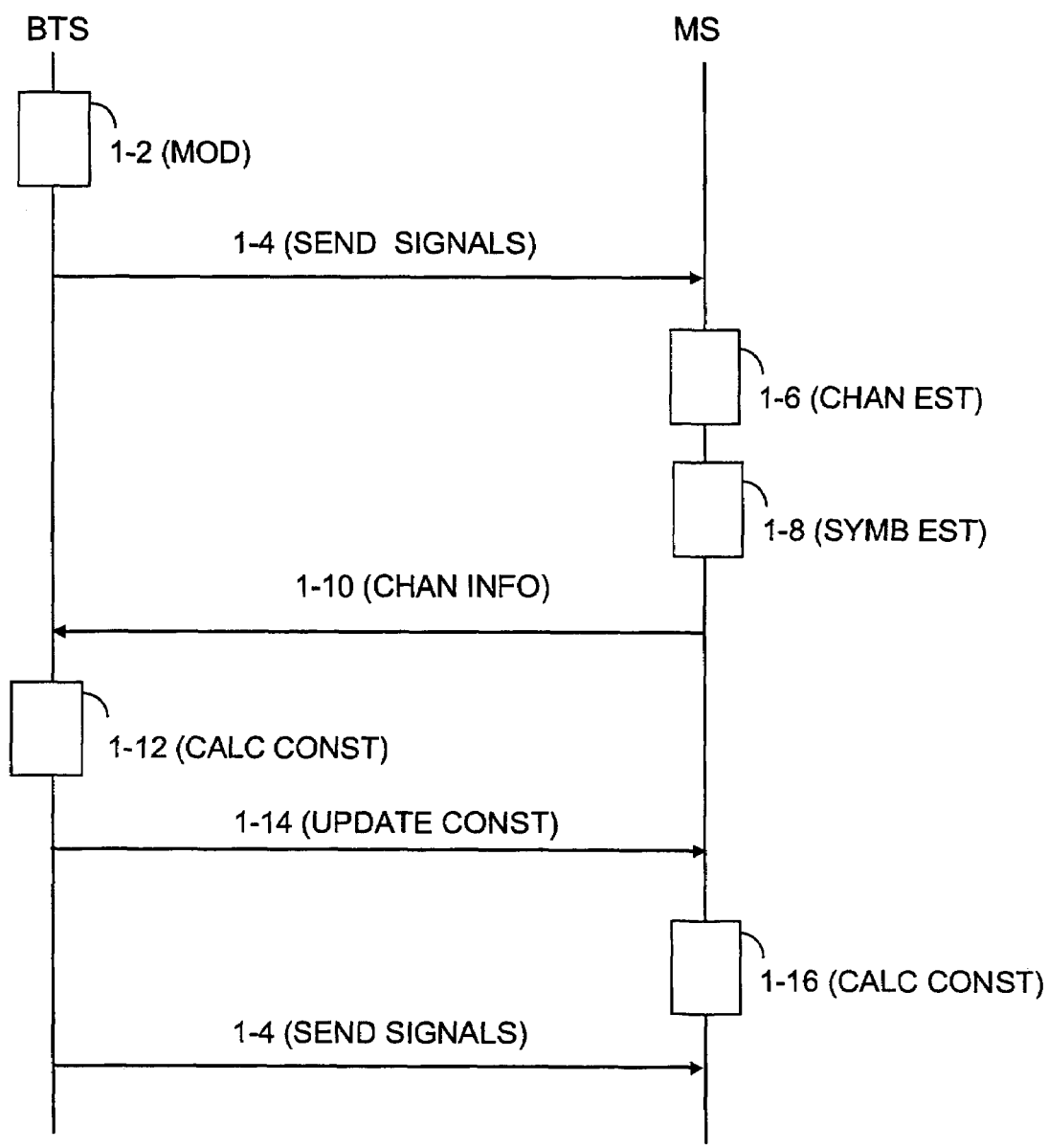
FIG. 1 shows a preferred embodiment of a method according to the invention.

The invention will be described below by means of preferred embodiments and with reference to the accompanying drawings. FIG. 1 shows a preferred embodiment of the method according to the invention. The figure shows signalling between a base station BTS and a mobile station MS and the operations carried out in these network parts. The first step 1-2 of the method comprises downlink transmission of information, such as user or control information. Information bits are converted into channel symbols according to the current bit-to-symbol mapping scheme for transmission via two or more transmitting antennas. The information to be transmitted can be divided in several manners to the antennas. For example in the case of two antennas, the information can be split in two such that two bits are transmitted via the first antenna, two bits via the second antenna, two bits again via the first antenna and so forth. It is also possible to transmit all the information via both antennas, in which case the information is transmitted via the second antenna in an interleaved, delayed or coded form.

Method step 1-4 of FIG. 1 comprises transmitting information from the transmitter BTS via at least two antennas. The pieces of information transmitted via different antennas are summed up over the radio path into a combined signal received in the receiver MS. In method step 1-6, the receiver MS forms channel parameters from the radio channel, i.e. estimates of the channels that were used to transmit the information. The transmissions sent via the antennas are separated and channel coefficients based on e.g. a one-tap channel model are formed from the channels. It is simultaneously estimated whether the channel parameters have changed to such an extent that the constellation point system in use should be updated. In method step 1-8, the receiver MS decomposes the received information by forming estimates of the transmitted symbols. The estimates are formed based on the constellation point system, which includes possible values of the combined signal that are used in an optimum receiver for selecting the constellation point closest to the value of the received signal.

Method step 1-10 describes transmission of a channel parameter from the receiver to the transmitter. A channel parameter can be transmitted e.g. on a control channel in a particular field once during a transmission frame, for instance. The channel parameter value can comprise channel information in various forms, such as the value of the channel coefficient, exceeding of the threshold value for the channel coefficient, or a number representing the antenna-specific bit-to-symbol mapping scheme to be used next. In method step 1-12, the transmitter utilizes the information received in step 1-10 to estimate whether the constellation point system should be updated. As an example, it is shown in method step 1-12 that the combined constellation is recalculated and the bit-to-symbol mapping scheme to be used is also reformed. It is assumed in FIG. 1 that the updating of the constellation point system is controlled by the transmitter BTS, which then informs the receiver in step 1-14 about the changing mapping scheme so that the receiver can reform the combined constellation to be used. The receiver calculates or starts using another constellation in step 1-16. When both the transmitter and the receiver know the new point system and the corresponding bit-to-symbol mapping scheme, the next frame can be transmitted in the recurring step 1-4 by means of the updated point system.

Figure 2A:
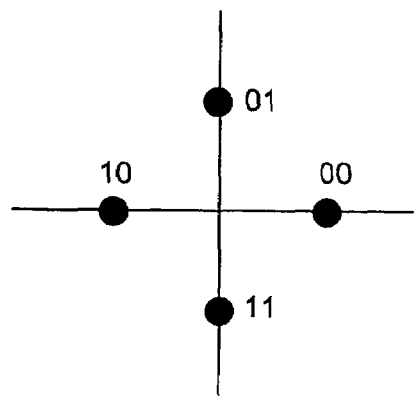
FIG. 2A shows an arrangement based on a fixed mapping scheme.
Figure 2B:
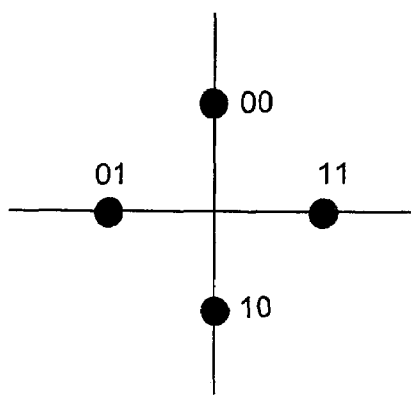
FIG. 2B shows, at a first instant, a bit-to-symbol mapping scheme changing according to channel status.
Figure 2B:
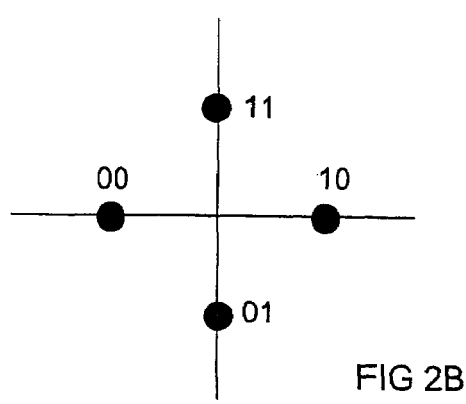
Figure 2C:
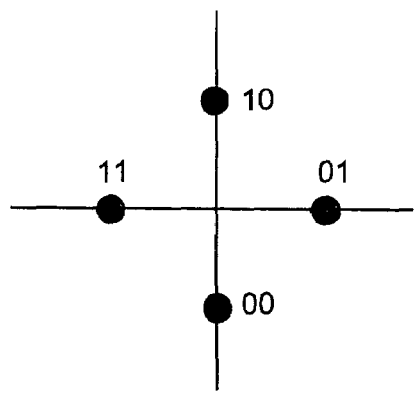
FIG. 2C shows, at a second instant, a bit-to-symbol mapping scheme changing according to the channel status.
Figure 2C:
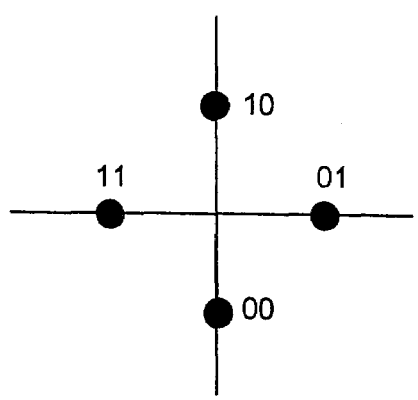
Figure 3A:
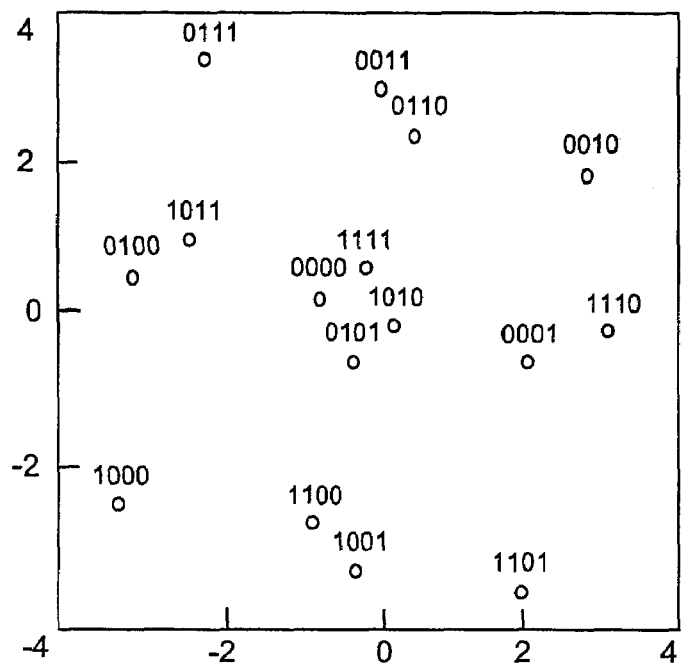
FIG. 3A shows a constellation provided by fixed modulation mapping in the case of first channel coefficients.
Figure 3B:
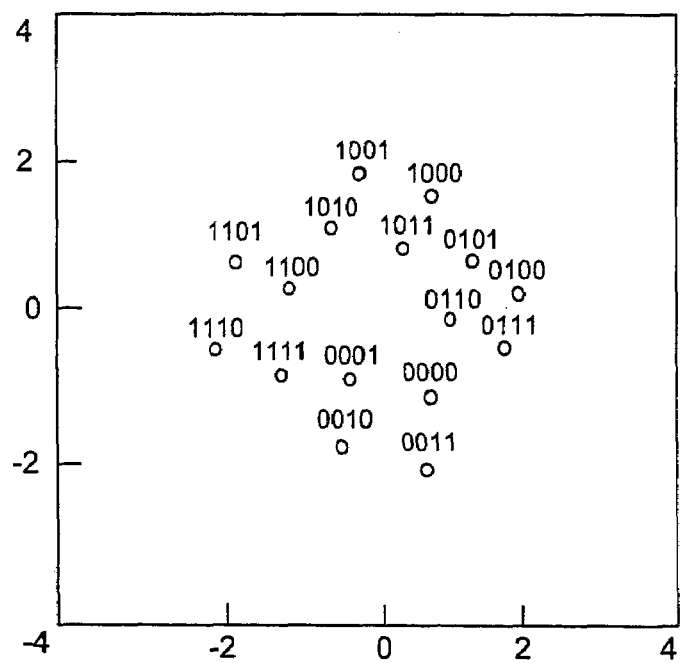
FIG. 3B shows a combined constellation provided by fixed mapping in the case of second channel coefficients.

The method according to the invention will be illustrated below with reference to FIGS. 2A to 3D. FIGS. 2A, 3A and 3B refer to a prior art arrangement and FIGS. 2B, 2C, 3C and 3D to an arrangement according to the invention. It is assumed in both examples that the binary word to be transmitted is [0111] and it is divided between the transmitting antennas such that the first antenna transmits binary word [01] and the second antenna transmits binary word [11]. The transmission of the aforementioned binary word is described by way of an example at two instants with different channel coefficients of the transmission channels. It is further assumed that the prior art arrangement utilizes a fixed modulation mapping scheme according to the QPSK modulation method as shown in FIG. 2A in both transmitting antennas at each instant. Bit combination 00 thus corresponds to complex channel symbol (1+0i), bit combination 01 corresponds to symbol (0+1i), combination 10 corresponds to symbol (−1+0i) and combination 11 corresponds to symbol (0−1i). The arrangement according to the invention in turn utilizes, at the first instant, the mapping scheme shown in FIG. 2B. The constellation used by the first transmitting antenna is shown on the left in FIG. 2B and the modulation constellation used by the second transmitting antenna is shown on the right. FIG. 2C in turn shows the modulation constellations used at the second instant in the bit-to-symbol mapping scheme of the arrangement according to the invention, the constellation of the first antenna being shown on the left and the constellation of the second antenna on the right.

The prior art arrangement is compared to the arrangement according to the invention by assuming that the signals to be transmitted via the transmitting antennas are mapped by means of a one-tap channel model, the channel coefficient of the first channel at the first instant being $c_1=1.4+1.1i$ and the channel coefficient of the second channel being $c_2=-2.0-0.9i$. The combined constellation used by the receiver for bit decisions can be formed by summing up the product of $c_1$ and the QPSK modulation points and the product of $c_2$ and the QPSK modulation points. Examine first FIG. 3A, which shows the constellation point system formed with the aforementioned channel coefficients. The values of the constellation points are shown in Table 1 in a situation where the first two bits of a 4-bit information section are transmitted via the first antenna and the last two bits via the second antenna.

TABLE 1

Calculation of constellation points

| Binary index | Calculation of signal value | Signal value |
| --- | --- | --- |
| 0 (0000) | $(1.4+1.1i)(1+0i)+(-2.0-9i)(1+0i)$ | −0.6 + 0.2i |
| 1 (0001) | $c_1(1+0i)+c_2(0+1i)$ | −2.3 − 0.9i |

TABLE 1-continued

Calculation of constellation points

| Binary index | Calculation of signal value | Signal value |
| --- | --- | --- |
| 2 (0010) | $c_1(1+0i)+c_2(-1+0i)$ | 3.4 + 2i |
| ... | ... | ... |
| 7 (0111) | $c_1(0+1i)+c_2(1+0i)$ | −2.0 + 3.4i |
| ... | | |

With reference to Table 1, FIG. 2A shows two different bit values in the complex plane. Binary word [0111] examined in this example thus corresponds to value (−2.0+3.4i) in the complex plane, which is a signal received by the receiver. Thus, the receiver makes decisions about the value of the received signal on the basis of the combined constellation shown in FIG. 2A. FIG. 3A clearly shows that there is a great likelihood of bit error decisions in the receiver. For example the points corresponding to binary words [0100] and [1011] are situated adjacent to one another in the complex plane. An erroneous decision with respect to these binary words would result in a maximum error of four bits.

Assume that the transmission channel changes and the new channel coefficients are $c_1=0.1-1.5i$ and $c_2=0.5+0.3i$. Therefore with the binary word [0111] used in the example, the prior art arrangement would provide the received signal with the value $(0+1i)(0.1-1.5i)+(0-i)(0.5+0.3i)=1.8-0.4i$. It is evident that the signal value the receiver has received differs significantly from the first instant, i.e. the signal value has changed from (−2.0+3.4i) to (1.8−0.4i). Due to the new channel coefficients, the locations of the binary words in the complex plane have also changed considerably. Furthermore, the binary words are not at all optimally located in view of signal decisions carried out by the receiver.

Figure 3C:
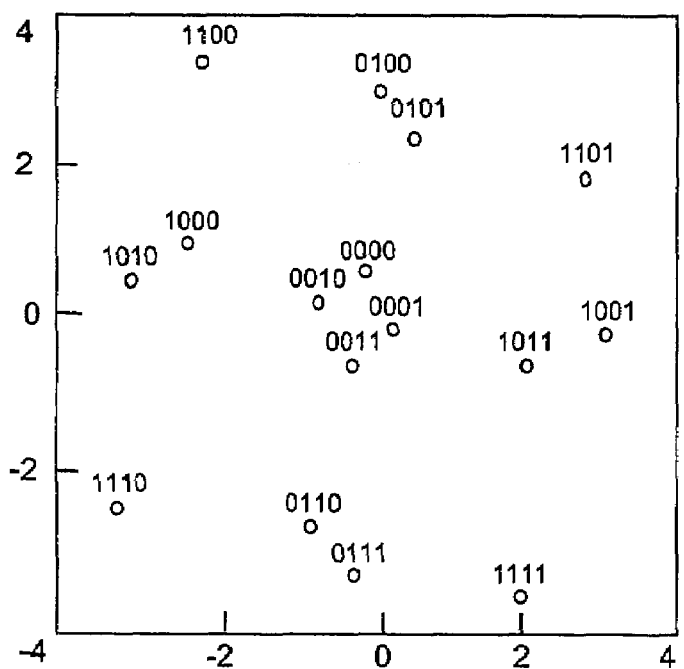
FIG. 3C shows a constellation changing according to the channel status in the case of the first channel coefficients.
Figure 3D:
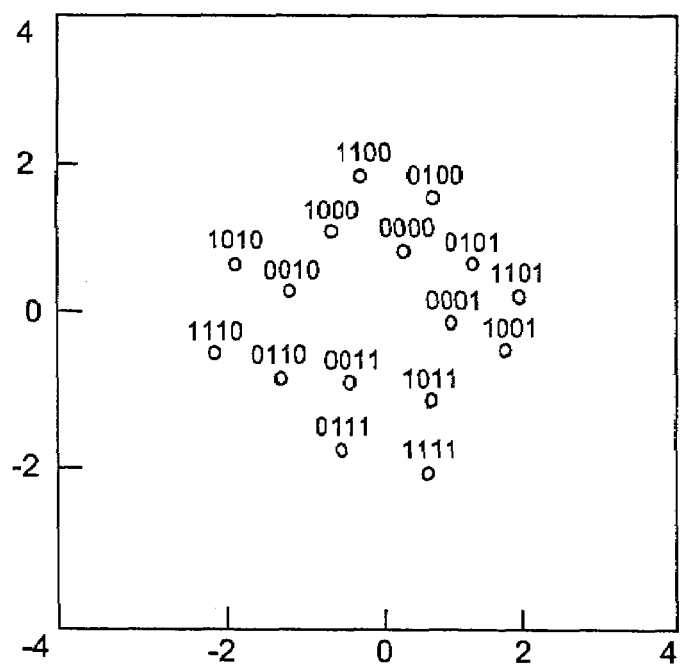
FIG. 3D shows the constellation changing according to the channel status in the case of the second channel coefficients.

Examine below the arrangement according to the invention with reference to FIGS. 3C and 3D. FIG. 3C shows the constellation of a combined signal transmitted by the antennas in the case of the channel coefficients of the first instant, i.e. $c_1=1.4+1.1i$ and $c_2=-2.0-0.9i$. In FIG. 3D, the channel coefficients are the coefficients of the second instant, i.e. $c_1=0.1-1.5i$ and $c_2=0.5+0.3i$. At the first instant, the transmitter utilizes the antenna-specific mapping schemes shown in FIG. 2B and at the second instant the mapping schemes shown in FIG. 2C. Comparison of the combined signal constellations shown in FIGS. 3C and 3D shows that the order of points in the constellation remains constant and only the distances between the points have changed along with the altered channel coefficients. Since the order of the constellation is the same in FIGS. 3C and 3D, the receiver can select for use the combined constellation with optimum protection against error decisions by the receiver. The constellation shows that the constellation points are arranged with a minimum Hamming distance of 1 between adjacent points. Therefore possible erroneous bit decisions will be mostly likely restricted to 1-bit errors.

In a situation according to a preferred embodiment of the invention shown in FIGS. 3C and 3D, the binary words to be transmitted are subjected to bit-to-symbol mapping by means of different modulation constellations for different values of channel coefficients. Suitable rotation of the modulation constellation thus provides a bit conversion resulting in the optimum reception constellation for the channel symbols shown in FIGS. 3C and 3D. In this arrangement, the transmitter and the receiver must be aware of the measured channel parameters and the mapping scheme to be used, and the coordination of these matters will be described below in connection with an arrangement illustrating the invention. With further reference to the method described above, it is evident that the order of the combined constellation shown in FIGS. 3C and 3D is only illustrated by way of an example, and the arrangement according to the invention is not restricted to the above description, nor is it naturally restricted to the modulation method used or the manner of dividing the information to be transmitted to the transmitting antennas.

Figure 4:
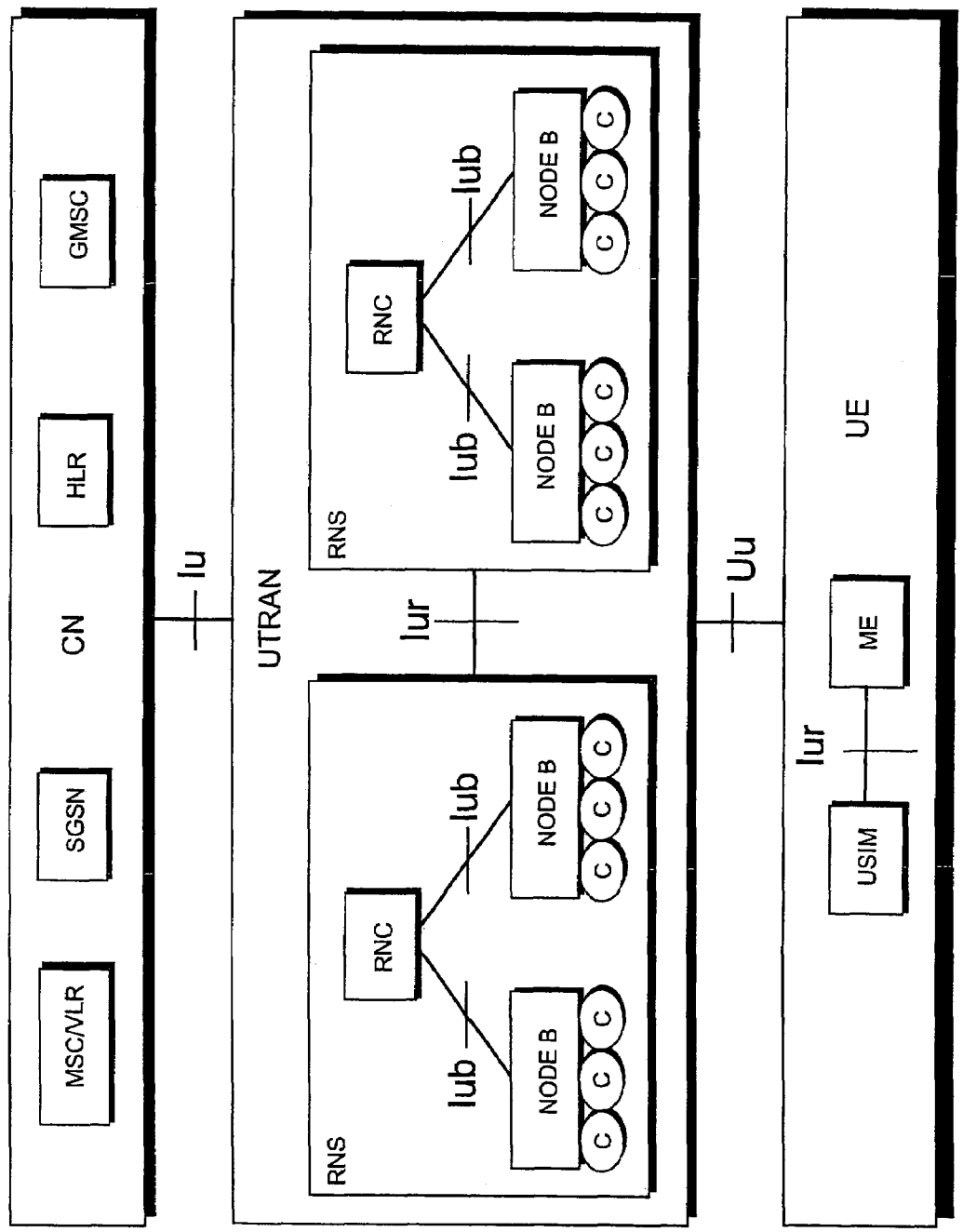
FIG. 4 shows a structural diagram of the structure of UMTS.

The invention will be described below with respect to the aforementioned arrangement and with reference to FIGS. 4 to 7. The equipment alternatives shown herein are not exhaustive, but it is evident to a person skilled in the art that the figures do not need to be described in more detail in order to illustrate the arrangement according to the invention. The description of the equipment contains references to a universal mobile telephony system (UMTS) without restricting the invention thereto, however. FIG. 4 shows generally the structure of the UMTS. The main elements of the system are a core network CN, a UMTS terrestrial radio access network UTRAN and a user equipment UE, which has been referred to as a mobile station MS in FIG. 1. The interface between the CN and the UTRAN is referred to as an Iu interface, and the air interface between the UTRAN and the UE is referred to as a Uu interface. The functionality related to a radio connection to the UE is carried out in the UTRAN. The CN in turn manages routing and connections to systems outside the UMTS, such as a public switched telephone network PSTN and the Internet.

The user equipment consists of two parts: a mobile equipment ME used as a radio terminal responsible for communication over the Uu interface, and a UMTS subscriber identity module USIM that is a smart card containing data required for user identification and authentication. The UTRAN comprises one or more radio network subsystems RNS, each of which in turn consists of at least one radio network controller RNC and nodes B or base stations denoted by BTS in FIG. 1. The primary function of node B is to manage the air interface to the UE and the related processing, such as channel coding, interleaving, power control and spreading of user signals. The RNC that controls node B in turn manages the UTRAN radio resources, the loading of the cells C of the RNC and the functionality related to allocation of new spreading codes in the cells. The core network comprises a gateway MSC GMSC providing access to external networks, a home location register HLR, a mobile services switching centre MSC, a visitor location register VLR, and a serving GPRS (General Packet Radio Service) support node SGSN providing packet switched connections with routing services.

The Uu radio interface is a three-layer protocol stack comprising a physical layer L1, a data link layer L2 and a network layer L3. The data link layer L2 is further divided into two sublayers, i.e. radio link control RLC and medium access control MAC. The L3 and the LAC are further divided into control C and user U planes. The L1 provides the transmission channels with information transfer services to the MAC and the higher layers. The L2/MAC in turn transmits the information between the physical transmission channels and the logical channels that are higher on the protocol stack.

Logical channels can be divided into control channels and traffic channels according to their functionality. UTRAN control channels include a broadcast control channel (BCCH) used for downlink transmission of system control information to the terminal equipments, a paging control channel (PCCH) for transmitting paging information for locating a terminal equipment in a cell, a dedicated control channel (DCCH) that is a bidirectional channel for transmitting control information between a terminal equipment and the network, and a common control channel (CCCH) that is a bidirectional channel for transmitting control information between a terminal equipment and the network and that is always linked to transmission channels related to call set-up, i.e. a random access channel (RACH) and a forward access channel (FACH). Traffic channels include a dedicated traffic channel (DTCH) that is a bidirectional traffic channel dedicated to one terminal equipment for transmitting user information, and a common traffic channel (CTCH) that is a point-to-multipoint channel for transmitting traffic information simultaneously to one or more terminals. With respect to transmission channels it can be stated by way of an example that e.g. logical channel BCCH is implemented on transmission channel BCH, logical channel DTCH is implemented on transmission channel DCH and logical channel PCCH on transmission channel PCH.

The transmission channels are implemented in the physical protocol layer L1 by means of physical channels. For example DTCH is implemented in the physical layer in a downlink dedicated physical channel (Downlink DPCH). In the uplink transmission direction, the modulation method is BPSK and in the downlink direction it is QPSK. The frame and burst structures used in the physical channels differ from one another depending on the physical channel used for transmission. For example in Downlink DPCH, a transmission frame of 10 ms includes 15 time slots, each of which has a duration of 0.667 ms. A data packet to be transmitted in a time slot is referred to as a burst, each burst consisting of 2560 chips. In one burst, chips 0 to 1103 typically contain data, chips 1104 to 1359 contain a training sequence, chips 1360 to 2463 contain again data, and the end of the burst comprises a 96-chip guard period. The training sequence consists of a number of symbols that are known both to the transmitter and the receiver and are used by the receiver to conclude the distortion produced in the information over the transmission path, this data on the distortion enabling the receiver to correct the information, if required. A training sequence to be used on an uplink channel is usually longer in order to facilitate the separation of bursts received by the base station from different users.

Figure 5:
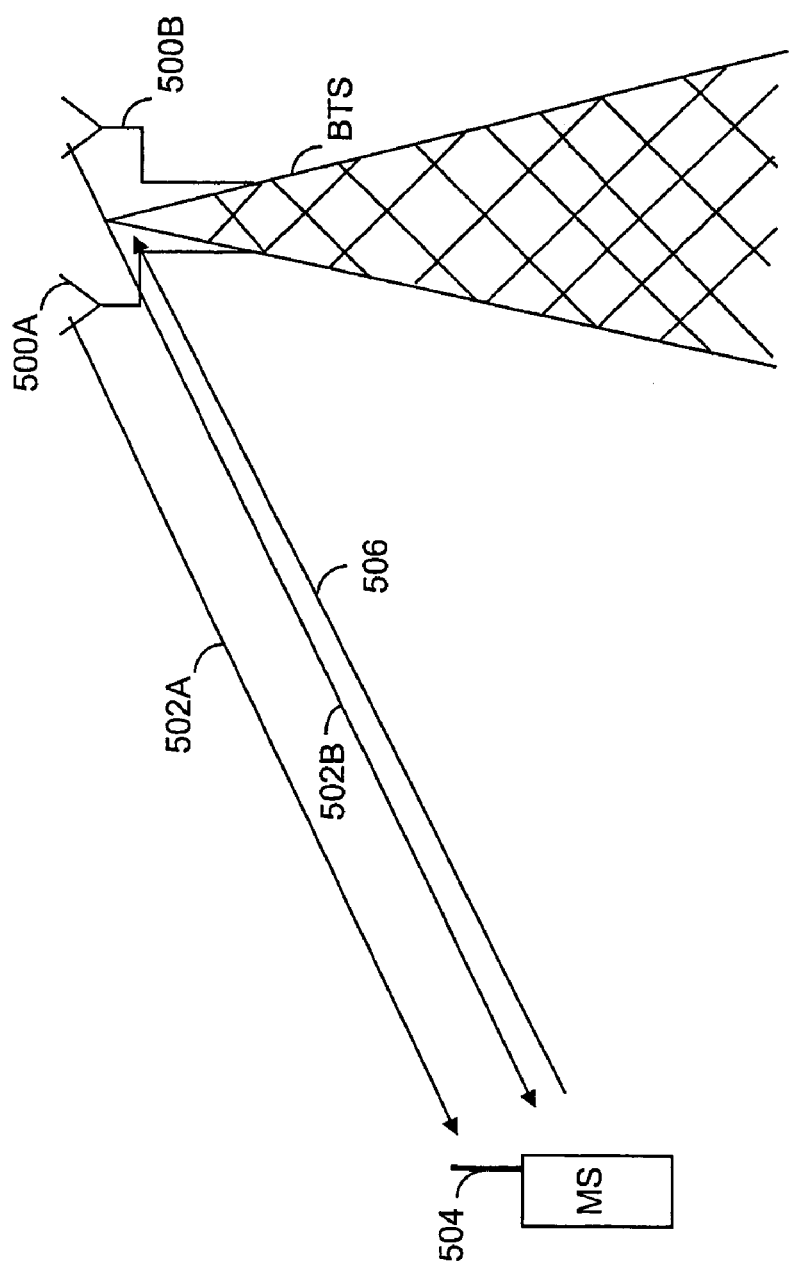
FIG. 5 shows an embodiment of an arrangement according to the invention.

The above description illustrates the UMTS very generally. With reference to the channels used in the UMTS, the bit-to-symbol mapping according to the invention can be performed on information transmitted both on channels dedicated to a user and on the common control channels. The direction of transmission can be either downlink or uplink, the only restriction resulting from the physical properties of the equipment, such as whether the terminal equipment is suitable for implementing a system with two transmitting antennas. FIG. 5 shows a base station BTS and a mobile station MS located in the coverage area of the base station and communicating with the base station over a bidirectional radio connection. Instead of the communication shown in the figure between the base station BTS and the mobile station MS, the arrangement according to the invention also enables transmission of information between base stations over the radio path, if required. In FIG. 5, downlink transmission from the base station BTS takes place via two transmitting antennas 500A and 500B, which constitute two transmission channels 502A and 502B, respectively, fading over the radio path. Signals transmitted to the transmission channels 502A and 502B are received in the mobile station by a receiving and transmitting antenna 504 and they can be combined coherently in the receiver. The figure also shows an uplink control channel 506 for transmitting control information from the mobile station MS to the base station BTS. Instead of or in addition to the control channel, the control information can also be transmitted by means of the data transmission capacity provided by user information, i.e. the control information can be adapted to the user information in a known manner. The need to transmit control information is the greatest particularly in cellular radio systems based on frequency division duplex (FDD), where the uplink and downlink directions are implemented at different frequency ranges. In systems based on TDD, both the transmitter and the receiver can independently carry out measurements on the communication channels used, and if the constellation point system is updated periodically or in some other manner according to common operating principles, there may be no need to transmit control information between the transmitter and the receiver.

Figure 6:
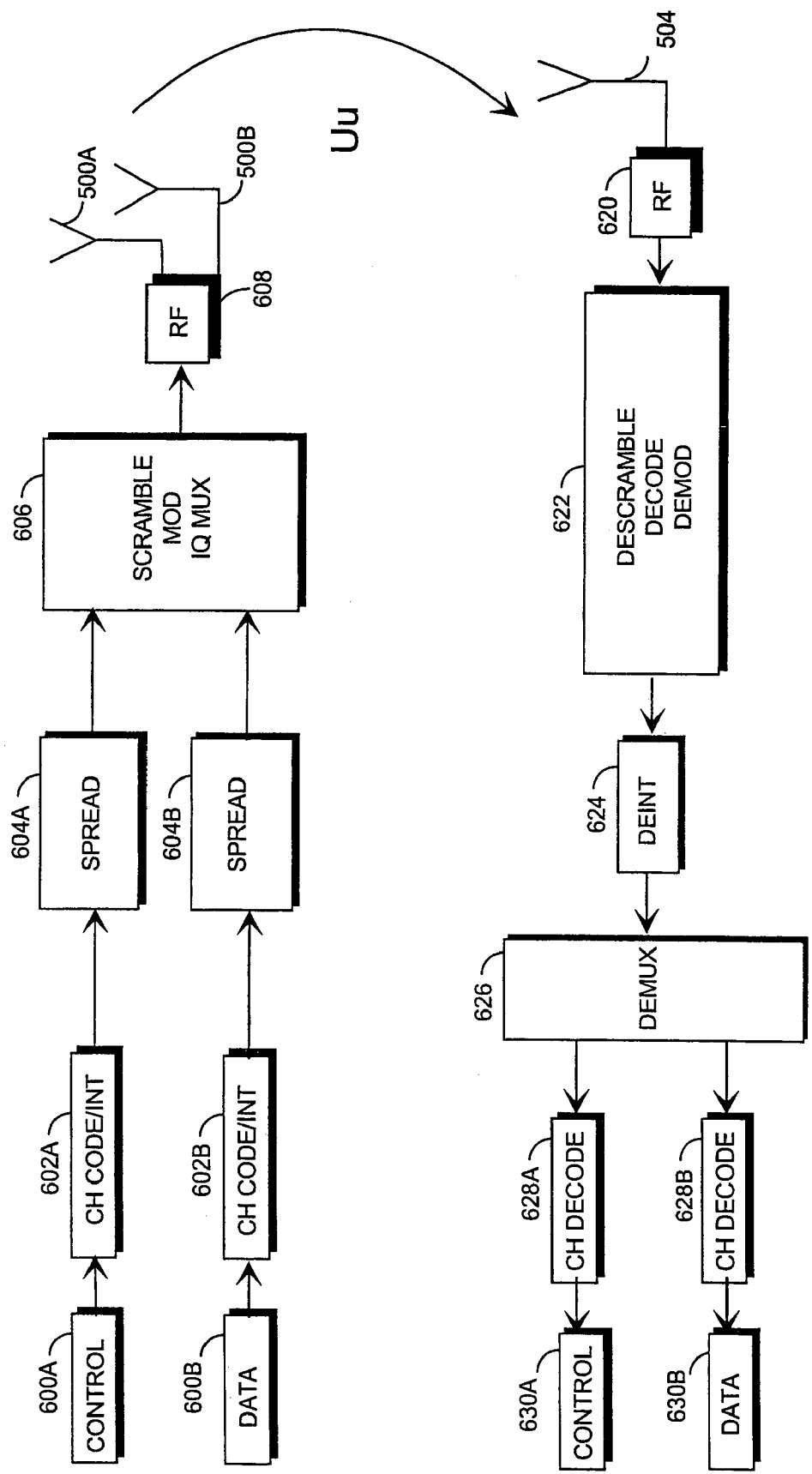
FIG. 6 shows a preferred structure of a transmitter and a receiver according to the invention.

The steps related to transmission of information to the physical channels of the radio path by the transmitter-receiver technique will be described below with reference to FIG. 6. In the situation according to the invention, a radio transmitter is located for example in a base station B/BTS and a radio receiver is situated e.g. in a subscriber terminal UE/MS. The upper half of FIG. 6 shows the essential functions of the radio transmitter, such that the upper row illustrates the steps of processing the control channel, and the lower row illustrates the steps of processing the traffic channel before the channels are combined and transmitted to the physical channel of the radio connection. The information 600B to be placed on the traffic channel includes speech, data and moving or still video image. The control channel is provided with control information 600A, such as system information, which in the case of a pilot channel consists of the pilot bits forming the training sequence and used by the receiver for channel estimation. The channels are subjected to channel coding in blocks 602A and 602B, the coding consisting e.g. of block coding or convolutional coding. However, pilot bits are not subjected to channel coding, since the purpose is to detect the distortions the channel causes to the signal. When the different channels have been channel-coded, they are interleaved in an interleaver 602A, 602B. The purpose of interleaving is to facilitate error correction. During interleaving the bits of different services are mixed together in a particular manner so that a momentary fading over the radio path does not necessarily make the transmitted information impossible to identify. The interleaved bits are spread by a spreading code in blocks 604A and 604B. The control channels and the traffic channels share the same code tree resources e.g. in a particular base station sector. However, the spreading codes of the control channels are fixed in the system in such a manner that the spreading codes allocated to the control channels are from level SF=256, and the spreading codes for indices 0, 1 and 16 are allocated to the control channels.

The chips obtained from the spreading are scrambled by a basestation-specific scrambling code and modulated in block 606, which also comprises the other measures required by the method according to the invention. Thus, block 606 comprises e.g. means for mapping the bits to channel symbols and means for forming a new bit-to-symbol mapping scheme or means for selecting a new mapping scheme based on the control information. If required, block 606 also comprises means for forming control information with which the transmitter and the receiver are able to use the same combined constellation. Block 606 also comprises means according to certain embodiments for setting a threshold value for the channel parameter and means for comparing the channel parameter to the set threshold value. The aforementioned means according of the preferred embodiments of the method according to the invention and the means according to the other preferred embodiments are implemented in the transmitter e.g. by means of software, separate logical components or ASICs (Application Specific Integrated Circuit). Furthermore, the signals obtained from different channels are combined in block 606 for transmission via the same transmitter. The combined signal is finally supplied to radio-frequency parts 608, which can comprise various power amplifiers and filters restricting the bandwidth. An analog radio signal is transmitted via at least two transmitting antennas 500A, 500B to the radio path Uu.

The lower half of FIG. 6 shows the essential functions of the radio receiver, which is typically a rake receiver. The analog radio-frequency signal is received from the radio path Uu by a receiving antenna 504. The signal is supplied to radio-frequency parts 620 and converted into an intermediate frequency or directly into a baseband, and the analog signal is sampled and quantized. Since the signal has propagated via several paths, the different multipath-propagated signal components are to be combined in block 622 comprising the actual rake fingers of the receiver. The information is composed from the combined signal by multiplying the signal with the user's spreading code. Block 622 also comprises carrying out the functions that are in accordance with the method according to the invention and required by the receiver of the invention. Therefore block 622 preferably comprises e.g. means for measuring the status of the radio channel for transmitting information, means for mapping channel symbols to bits, means for forming a new combined constellation and means for selecting a new constellation point system based on the control information. If required, block 622 also comprises means for forming control information with which the transmitter and the receiver can use the same constellation point system. In order to form a new combined constellation, the receiver only has to have information on the channel, e.g. channel coefficients. When the receiver knows the locations of the general points of the combined constellation with respect to one another, it can use the channel coefficients to independently form a new combined constellation. The only matter to be co-ordinated by the receiver and the transmitter is the instant of introducing the new constellation. Block 622 also comprises means according to certain embodiments for setting a threshold value for the channel parameter and means for comparing the channel parameter to the set threshold value. The means according to the preferred embodiments of the method of the invention and the means according to the other preferred embodiments are implemented in the receiver e.g. by means of software, separate logical components or ASICs (Application Specific Integrated Circuit).

The obtained physical channel is deinterleaved in deinterleaving means 624, and the deinterleaved physical channel is divided in a demultiplexer 626 into data streams for different channels. Each channel is guided into a separate channel decoding block 628A and 628B, the output of which provides the control information 630A and the user data 630B transmitted from the transmitter.

Even though the above description relates to the operations according to the invention carried out in blocks 606 and 622, the description should be interpreted generally so that the functions described herein are not restricted to the elements in question. For example block 606 is preferably provided with feedback to block 600A, which actually forms the control information for providing a new constellation point system.

Figure 7A:
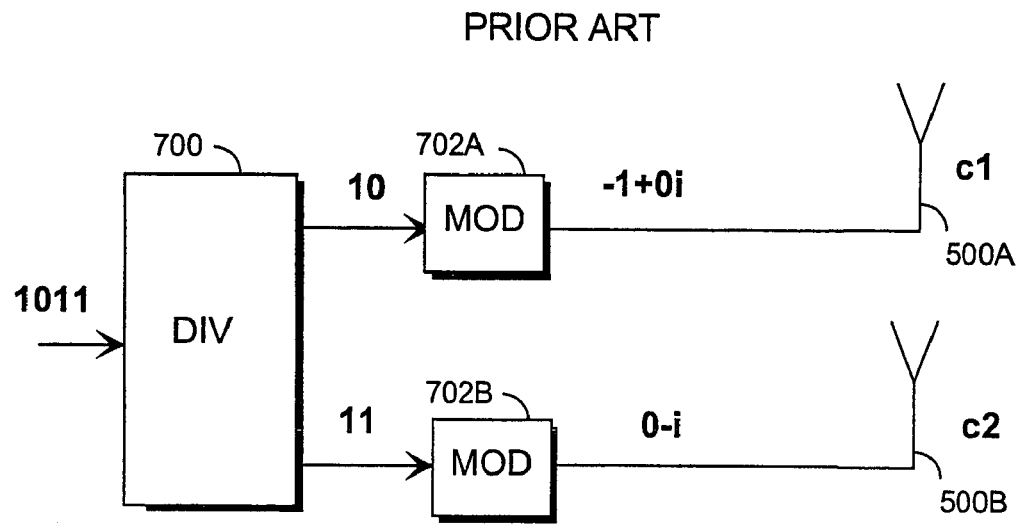
FIG. 7A shows a prior art transmitter.
Figure 7B:
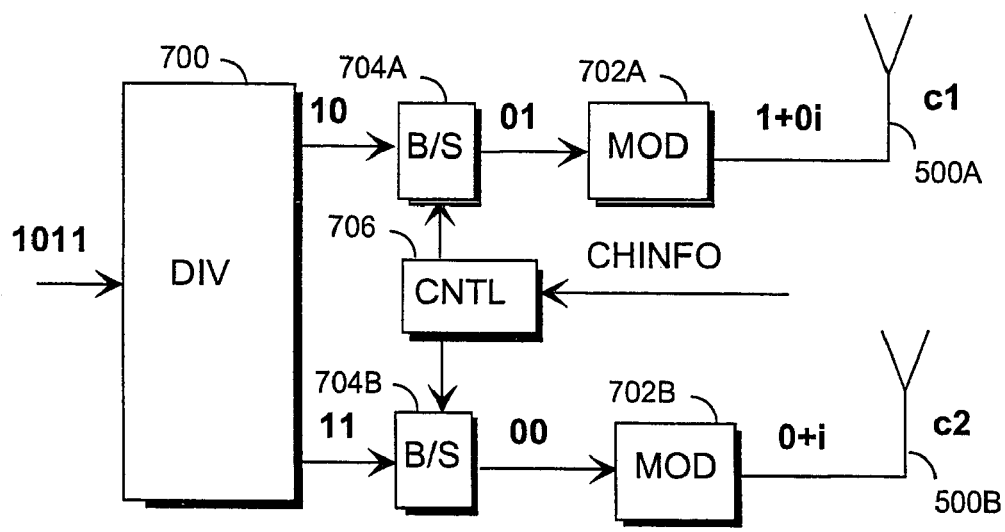
FIG. 7B shows a transmitter according to a preferred embodiment of the invention.

FIG. 7A shows a prior art transmitter and FIG. 7B shows a transmitter according to a preferred embodiment of the invention. The transmitters comprise a block DIV 700, which receives a bit stream and divides it between the antennas. The bits received in FIG. 7B are modulated in blocks 702A and 702B and transmitted to the radio path via antennas 500A and 500B, respectively. The transmission channels to be transmitted via the transmitting antennas 500A, 500B have particular time-dependent channel coefficients c1 and c2, respectively, that describe the fading and delay caused by the channel in the signal. FIG. 7C shows a transmitter according to a preferred embodiment of the invention, which comprises means 704A and 704B for providing bit-to-symbol mapping. For example block 704A converts received bits 10 to bits 01, and block 704B carries out bit conversion 11→00. The bits obtained from the outputs of means 704A and 704B are further guided to modulation blocks 702A and 702B for transmission via transmitting antennas 500A and 500B. The means for providing bit-to-symbol mapping are guided by bit-to-symbol mapping control means 706, which receive, as input, for example channel information or information about the status of the constellation point system used. The aforementioned means and the other means implementing the method according to the invention are realized in the receiver e.g. by means of software, separate logical components or ASICs.

Even though the invention is described above with respect to the example according to the accompanying drawings, it is clear that the invention is not restricted thereto but it can be modified in various manners within the scope of the inventive idea disclosed in the appended claims.

The invention claimed is:

1. A method, comprising:
mapping bits contained in information to be transmitted with antenna-specific bit-to-symbol mappings in a transmitter to channel symbols for transmission to a radio channel via at least two transmitting antennas;
measuring a status of the radio channel used for transmitting the information;
estimating a combination constellation by using the antenna-specific bit-to-symbol mappings and status information of the radio channel; and
changing binary representations of the channel symbols of at least one of the antenna-specific bit-to-symbol mappings such that an order of constellation points in the combination constellation remains the same although the status information of the radio channel changes.

2. A method according to claim 1, further comprising changing the channel symbols to be transmitted via different antennas in the bit-to-symbol mapping such that the value of the signal to be transmitted to a receiver corresponds to the radio channel status in the combined constellation.

3. A method according to claim 1, wherein when the bit-to-symbol mapping scheme is to be changed, all the possible combinations of symbols multiplied with channel parameters and to be transmitted via the different antennas are summed up to form a combined constellation.

4. A method according to claim 1, wherein when the bit-to-symbol mapping scheme is to be changed, the transmitter utilizes a mapping group containing at least two predetermined mapping schemes and selects the mapping scheme to be used from the mapping group on the basis of the measured status of the radio channel.

5. A method according to claim 1, wherein during measurement of the radio channel status, a channel parameter is formed to represent one or more of the following: channel coefficients of transmission channels formed by transmitting antennas, a phase difference or an amplitude difference between two antennas, an identifier of the mapping scheme to be used.

6. A method according to claim 1, further comprising changing the bit-to-symbol mapping scheme periodically to correspond to the status of the transmission channel.

7. A method according to claim 1, further comprising setting a threshold value for a channel coefficient describing the phase and amplitude of the signal to be transmitted at one or several instants, exceeding of the threshold value resulting in reformation of the bit-to-symbol mapping scheme.

8. A method according to claim 1, wherein during the measurement of the radio channel status, a channel parameter representing the radio channel status is formed in one or more of the following manners: measuring the channel status in a receiver, measuring the channel status in the transmitter, measuring the channel status in both the transmitter and the receiver.

9. A method according to claim 8, further comprising transmitting the channel parameter representing the channel status from the transmitter to the receiver or vice versa.

10. A method according to claim 1, further comprising transmitting at least some of the information bits via a first transmitting antenna of the transmitter transmitting to the first transmission channel, and at least some of the information bits via at least one other transmitting antenna of the transmitter transmitting to the other transmission channels, the information transmitted to the first channel and to the other transmission channels forming a combined signal on the radio path, the values obtained by the signal being represented in the system by a combined constellation and the combined signal being received in a receiver, which carries out symbol and bit decisions on the information in the received combined signal on the basis of the combined constellation.

11. A method according to claim 10, further comprising arranging binary indices in the combined constellation of the bit-to-symbol mapping scheme such that the Hamming distance between adjacent constellation points is at a minimum.

12. An arrangement for transmitting information between a transmitter and a receiver in a mobile system, comprising:
mapping means for mapping information bits into channel symbols for transmission via at least two transmitting antennas with antenna-specific bit-to-symbol mappings,
at least two transmitting antennas for transmitting the channel symbols to a radio channel of the mobile system,
estimator means for estimating a combination constellation by using the antenna-specific bit-to-symbol mappings and status information of the radio channel,
measuring means for measuring a status of the radio channel used for transmission of the information, wherein the mapping means changes a binary representation of the channel symbols for at least one of the antenna-specific bit-to-symbol mapping scheme such that the order of the constellation points in the combination constellation remains the same although the status information of the radio channel changes.

13. An arrangement according to claim 12, wherein the mapping means are arranged to change the bits to be transmitted via different antennas in the bit-to-symbol mapping scheme such that the value of the combined signal transmitted to the receiver corresponds to the radio channel status.

14. An arrangement according to claim 12, wherein when the bit-to-symbol mapping scheme is being formed, the mapping means are arranged to sum up all the possible combinations of symbols multiplied with channel parameters and to be transmitted via different antennas to form a combined constellation.

15. An arrangement according to claim 12, wherein the mapping means are arranged to utilize, in the transmitter, a mapping group containing at least two predetermined bit-to-symbol mapping schemes and to select the bit-to-symbol mapping scheme to be used from the mapping group on the basis of the measured radio channel status.

16. An arrangement according to claim 12, wherein during measurement of the radio channel status, the measuring means are arranged to form a channel parameter representing one or more of the following: channel coefficients of transmission channels formed by transmitting antennas, a phase difference or an amplitude difference between two antennas, an identifier of the mapping scheme to be used.

17. An arrangement according to claim 12, wherein the transmitter and the receiver are arranged to use a bit-to-symbol mapping scheme that changes periodically according to the status of the transmission channel.

18. An arrangement according to claim 12, wherein the mobile system is arranged to set a threshold value for the channel coefficient representing the phase and amplitude of the signal to be transmitted at one or several instants, exceeding of the threshold value resulting in reformation of the bit-to-symbol mapping scheme by the transmitter and the receiver.

19. An arrangement according to claim 12, wherein the measuring means are arranged to form the channel parameter representing the radio channel status in one of the following manners: measuring the channel status in the receiver, measuring the channel status in the transmitter, measuring the channel status in both the transmitter and the receiver.

20. An arrangement according to claim 19, wherein the receiver comprises means for transmitting the channel parameter representing the channel status to the transmitter.

21. An arrangement according to claim 12, wherein the transmitting means for transmitting at least some of the bits via a first transmitting antenna of the mobile system transmitting to the first transmission channel, and at least some of the bits via at least one other transmitting antenna of the transmitter transmitting to the other transmission channels, the information transmitted to the first channel and to the other transmission channels forming a combined signal on the radio path, the values obtained by the signal being represented in the system by a combined constellation, the combined signal being received by receiving means in the receiver, wherein the receiver further comprises means for carrying out symbol and bit decisions on the information in the received combined signal on the basis of the combined constellation.

22. An arrangement according to claim 12, wherein information transmitted on a radio channel of the mobile system is mapped by means of a combined constellation, and the mobile system is arranged to use a combined constellation where the Hamming distance between adjacent constellation points is at a minimum.

23. A transmitter in a mobile system, comprising:
mapping means for mapping information bits into channel symbols for transmission via at least two transmitting antennas with antenna-specific bit-to-symbol mappings;
processing means for processing measurement information on a status of a mobile system radio channel; and
estimator means for estimating a combination constellation by using the antenna-specific bit-to-symbol mappings and status information of the radio channel,
wherein the mapping means changes a binary representation of the channel symbols for at least one of the antenna-specific bit-to-symbol mappings such that the order of the constellation points in the combination constellation remains the same although the status information of the radio channel changes.

24. A transmitter according to claim 23, wherein information to be transmitted on the mobile system radio channel is described by means of a combined constellation, and that the mobile system is arranged to use a bit-to-symbol mapping scheme resulting in a combined constellation where the Hamming distance between adjacent constellation points is at a minimum.

25. A transmitter according to claim 23, wherein the signals transmitted via different antennas form a combined signal on the radio channel, the values obtained by the signal being described by means of a combined constellation, and that the mapping means are arranged to change the bits to be transmitted via different antennas in the bit-to-symbol mapping scheme such that the value of the combined constellation transmitted to the receiver corresponds to the radio channel status.

26. A transmitter according to claim 23, wherein the mapping means are arranged to utilize, in the transmitter, a mapping group containing at least two predetermined bit-to-symbol mapping schemes and to select an antenna-specific bit-to-symbol mapping scheme from the mapping group on the basis of the measured radio channel status.

27. A transmitter according to claim 23, wherein the processing means are arranged to form information representing the channel status and describing one or more of the following: channel coefficients of transmission channels formed by transmitting antennas, a phase difference or an amplitude difference between two antennas, an identifier of the mapping scheme to be used.

28. A receiver in a mobile system, comprising
means for receiving a combined signal comprising signals transmitted via at least two transmitting antennas, wherein the signals comprises channel symbols;
means for carrying out bit decisions on the combined signal by means of a combined constellation that represents values the received combined signal obtains in a complex plane, wherein the combination constellation is estimated by using antenna-specific bit-to-symbol mappings and status information of a radio channel;
means for processing measurement information on the radio channel used in the transmission of the received signal; and
means for reforming the combined constellation used for bit decisions as the radio channel status changes by changing a binary representation of the channel symbols for at least one of the antenna-specific bit-to-symbol mappings such that the order of the constellation points in the combination constellation remains the same although the status information of the radio channel changes.

29. A receiver according to claim 28, wherein the radio channel status is described by means of a channel parameter, such as channel coefficients of the transmission channels transmitted via the transmitting antennas, or a phase or amplitude difference between the antennas.

30. A receiver according to claim 28, wherein the receiver comprises means for receiving the control information from the transmitter in order to reform the combined constellation.

31. A receiver according to claim 28, wherein the receiver is arranged to utilize a combined constellation where the Hamming distance between adjacent constellation points is at a minimum for carrying out bit decisions.

32. An apparatus in a mobile system, comprising:
- a mapping unit configured to map information bits into channel symbols for transmission via at least two transmitting antennas with antenna-specific bit-to-symbol mappings;
- a processor configured to process measurement information on a status of a mobile system radio channel; and
- an estimator configured to estimate a combination constellation by using the antenna-specific bit-to-symbol mappings and status information of the radio channel,
- wherein the mapping unit is configured to change a binary representation of the channel symbols for at least one of the antenna-specific bit-to-symbol mappings such that the order of the constellation points in the combination constellation remains the same although the status information of the radio channel changes.

33. A receiver in a mobile system, comprising:
- a receiving unit configured to receive a combined signal comprising signals transmitted via at least two transmitting antennas, wherein the signals comprises channel symbols;
- a carrying out unit configured to carry out bit decisions on the combined signal using a combined constellation that represents values the received combined signal obtains in a complex plane, wherein the combination constellation is estimated by using antenna-specific bit-to-symbol mappings and status information of a radio channel;
- a processing unit configured to process measurement information on the radio channel used in the transmission of the received signal; and
- a reforming unit configured to reform the combined constellation used for bit decisions as the radio channel status changes by changing a binary representation of the channel symbols for at least one of the antenna-specific bit-to-symbol mappings such that the order of the constellation points in the combination constellation remains the same although the status information of the radio channel changes.

* * * * *